(12) United States Patent
Mahajan et al.

(10) Patent No.: US 10,104,504 B2
(45) Date of Patent: Oct. 16, 2018

(54) SYSTEM AND METHOD FOR DETERMINING A SPECIFIC USER LOCATION AND A PATH TO AN EXIT

(71) Applicants: Vinay Mahajan, West Windsor, NJ (US); Christian Navarro, Bayonne, NJ (US); Trisha Mahajan, Bayonne, NJ (US)

(72) Inventors: Vinay Mahajan, West Windsor, NJ (US); Christian Navarro, Bayonne, NJ (US); Trisha Mahajan, Bayonne, NJ (US)

( * ) Notice: Subject to any disclaimer, the term of this patent is extended or adjusted under 35 U.S.C. 154(b) by 0 days.

(21) Appl. No.: 15/689,811

(22) Filed: Aug. 29, 2017

(65) Prior Publication Data

US 2018/0048998 A1 Feb. 15, 2018

Related U.S. Application Data

(63) Continuation-in-part of application No. 14/976,912, filed on Dec. 21, 2015, now Pat. No. 9,781,563.

(60) Provisional application No. 62/095,132, filed on Dec. 22, 2014.

(51) Int. Cl.
*H04W 4/02* (2018.01)
*H04W 4/04* (2009.01)
*H04M 1/725* (2006.01)
*H04W 4/90* (2018.01)

(52) U.S. Cl.
CPC ....... *H04W 4/023* (2013.01); *H04M 1/72569* (2013.01); *H04W 4/025* (2013.01); *H04W 4/043* (2013.01); *H04M 2250/12* (2013.01); *H04W 4/90* (2018.02)

(58) Field of Classification Search
CPC ..... H04W 4/023; H04W 4/043; H04W 4/025; H04W 4/22
USPC ........ 701/434, 516; 340/7.27, 539.18, 691.3, 340/7.48; 455/404.2
See application file for complete search history.

(56) References Cited

U.S. PATENT DOCUMENTS

| | | | | |
|---|---|---|---|---|
| 2009/0193501 A1* | 7/2009 | Shing | ...................... | G06F 21/32 726/3 |
| 2011/0136463 A1* | 6/2011 | Ebdon | .................... | G01C 21/20 455/404.1 |
| 2014/0011518 A1* | 1/2014 | Valaee | .................. | H04W 64/00 455/456.1 |
| 2016/0049064 A1* | 2/2016 | McNabb | ................ | G08B 21/10 340/540 |

* cited by examiner

*Primary Examiner* — Inder Mehra
(74) *Attorney, Agent, or Firm* — Dunlap Bennett & Ludwig PLLC; Brendan E. Squire

(57) ABSTRACT

A system and method for determining a specific user location and path to an exit during an emergency condition. In response to an emergency alarm activated for a structure, a notification system may receive the alarm signal. The notification system may send a notification of the alert to a user mobile device when the user has subscribed to receive alerts regarding the structure. The notification may determine that the subscribed mobile device is located in the vicinity of the structure and activate an alarm on the device.

18 Claims, 4 Drawing Sheets

SYSTEM AND METHOD FOR DETERMINING A SPECIFIC USER LOCATION AND A PATH TO AN EXIT

CROSS-REFERENCE TO RELATED APPLICATION

This application is a continuation in part of U.S. patent application Ser. No. 14/976,912, filed Dec. 21, 2015. This application claims the benefit of priority of U.S. provisional application No. 62/095,132, filed Dec. 22, 2014, the contents of which are herein incorporated by reference.

BACKGROUND OF THE INVENTION

The present invention relates to emergency notification and response systems and, more particularly, to providing alerts to an emergency condition and guidance instructions to evacuate the area.

When a fire emergency occurs in a high rise building, it can be very hard to figure out where is the closest path to an exit. Similarly, for a building occupant that may be trapped from exiting the structure, it can be difficult to relay the trapped occupant's location to emergency response personnel.

Both of these circumstances can be especially true if a person may only be a visitor to the building.

As can be seen, there is a need for a method for determining a specific user location during an emergency situation so that the user may receive instructions for evacuating the area in the safest, most expeditious manner.

SUMMARY OF THE INVENTION

In one aspect of the present invention, a method for determining a location and path is disclosed. The method comprises: notifying an automated notification system that an emergency alarm has been triggered at a specified location, the notification system hosted on a server; transmitting a notification from the notification system to a mobile application operating in a non-transitory memory of a mobile device, the notification indicating that the emergency alarm at the specified location has been triggered; triggering the mobile application to activate a device alarm on the mobile device; determining a position of the mobile device within the specified location; providing a map on a display screen on the mobile device, the map corresponding to the determined position of the mobile device; and providing instructions on a path towards an exit within the specified location.

In other aspects of the invention, the step of determining the position of the mobile device within the specified location may further comprise: receiving geographic coordinates of the mobile device; and determining an elevation of the mobile device. The step of determining the elevation of the mobile device may further comprise: receiving a barometric pressure measurement from the mobile device; receiving an atmospheric pressure and a temperature for an area in the vicinity of the specified location; and calculating an estimated elevation of the device at the specified location.

The step of determining the elevation of the mobile device may further comprise: comparing the estimated elevation of the device to a building plan corresponding to the specified location to determine a current floor of the specified location where the device is located. Determining the elevation of the mobile device may also include receiving a GPS altitude signal from the mobile device.

In other aspects of the invention the step of providing the map on the display screen further comprises: providing a map corresponding to the current floor of the specified location. The step of providing instructions on the path towards the exit within the specified location may also include providing instructions on the path from the current floor to the exit.

In certain embodiments of the invention, the step of triggering the mobile application to activate the device alarm occurs after the notification system receives information indicating the mobile device is located in a near proximity of the specified location.

In yet another aspect of the invention, a method of locating a distressed mobile device user is disclosed. The method comprises: receiving a notification of an emergency condition at a specified location on a mobile device located at the specified location; and monitoring for a supersonic audio signal on the mobile device. The method may also include activating a supersonic audio SOS signal on a user interface of the mobile device of the distressed mobile device user; and broadcasting the supersonic audio SOS signal through a device speaker of the distressed mobile device user.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a method for determining a specific location and path comprising: notifying a notification system that a fire alarm has been triggered; pushing a notification to a mobile application on a mobile device; triggering an alarm on the mobile application; providing a map on a screen on the mobile device; and providing instructions on a path towards an exit within a building. As used herein, the system contemplated by the present invention may be referred to as the Smart Application Fire Exit (SAFE).

The present invention may include at least one computer with a user interface. The computer may include any computer including, but not limited to, a desktop, laptop, and smart mobile computing device, such as, a tablet and smart phone. The computer includes a program product including a machine-readable program code for causing, when executed, the computer to perform steps. The program product may include software which may either be loaded onto the computer or accessed by the computer. The loaded software may also include an application on a smart device. The software may be accessed by the computer using a web browser.

Figure 1:
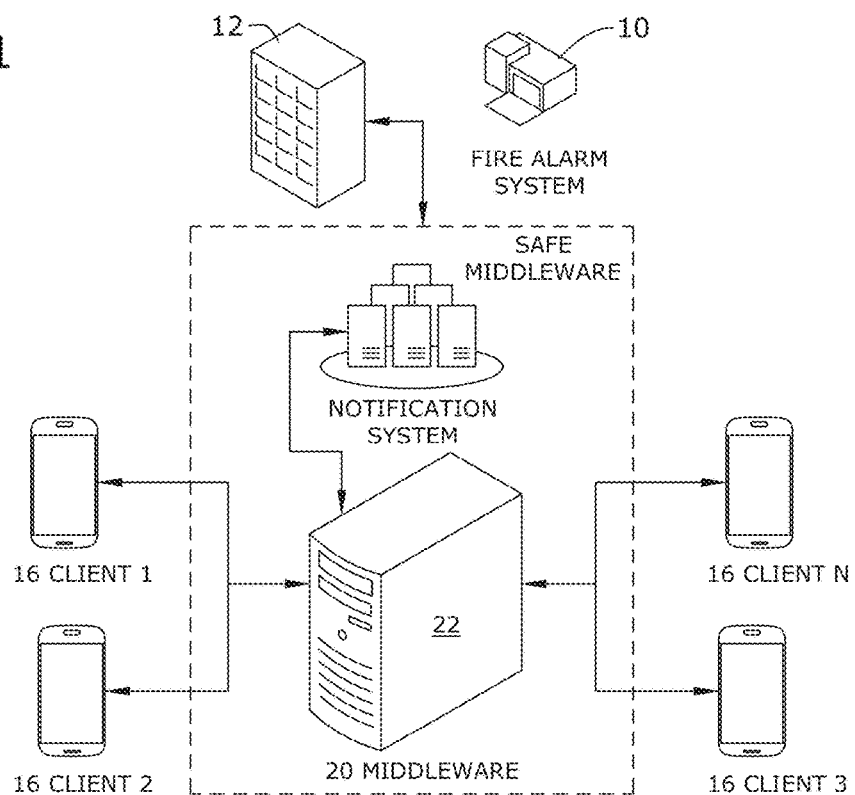
FIG. 1 is a system architecture for the SAFE system.

The computer may access the software via the web browser using the internet, extranet, intranet, host server, internet cloud and the like. As is illustrated in FIG. 1 a representative system architecture is depicted. An embodiment of a method for determining a specific location and path may include accessing a mobile application. A user with a mobile device may download the application. The user may subscribe to receive notifications for the application and for at least one specific building. The mobile application may be connected to at least one fire detection system. The at least one fire detection system may include a fire alarm that may be triggered in the case of a fire emergency. At least one building map may be included with the application.

Hosting Options

The SAFE system will require integration with the building 12 emergency alarm system 10. This integration may be done through the use of a middleware component 20, hosted on a server 22 which will relay notifications from the emergency system to the end user devices 16. The SAFE solution may be provided to potential clients 16 with various options, such as to install & host the middleware on premises; or to use middleware hosted in a cloud hosting service, such as Amazon, Google, etc.

The middleware component 20 of the system may also be configured to interact with a messaging system, for example the Apple Push Notification System (APNS), the Google Cloud Messaging (GCM), or like messaging systems. It may also act as a gateway for all notifications coming from the building's alarm system to the user's mobile devices 16.

Login & Registration Module

The first time the application is launched, users 14 will have an option to register. The registration process requires users 14 to enter an ID sent to their email address. Once they have logged into the application, the device will store this information and may keep them logged in going forward. Once the credentials are validated, the user 14 lands on the application main screen where they can see which locations or buildings 12 they're currently subscribed to. A subscription to a building 12 means the user 14 will be notified and alerted of any emergencies relating to that building 12 that may be communicated via a fire alarm system 10. The user 14 may also grant permissions for tracking the user's location for the predictive analytics module.

Push Notification Module

Once the user 14 has registered in the system, they will have the ability to subscribe to a building 12 to receive alert notifications. In the background, the SAFE system leverages the Apple Push Notification System to send and receive push notifications on the mobile devices (Client 1-Client N). When a push notification is received, the application retrieves the current floor details and proceeds to take the user directly to the navigation/guidance screen of the floor they are currently on.

Geofencing Module

The SAFE application allows users 14 to subscribe to more than one building 12. For enterprises, this is particularly useful when a company has more than one building 12. It can also be used by users 14 to subscribe to multiple buildings 12 for which they user may want to receive alerts from. The geofencing module makes use of the device GPS and Location Based notification alerts to determine if a user 14 is located within, nearby or close to a specific location 12. The application may monitor when they are in the building 12 or close by. This monitoring allows the system to determine if the user 14 is in any danger at the time of an emergency and provide an alert notification when an incident occurs. While the user 14 is in or near a subscribed building, location data for the user 14 may be periodically communicated to the SAFE server for processing by a predictive analytics module to facilitate a determination of the user's location in the building in the event of an emergency.

Figure 3:
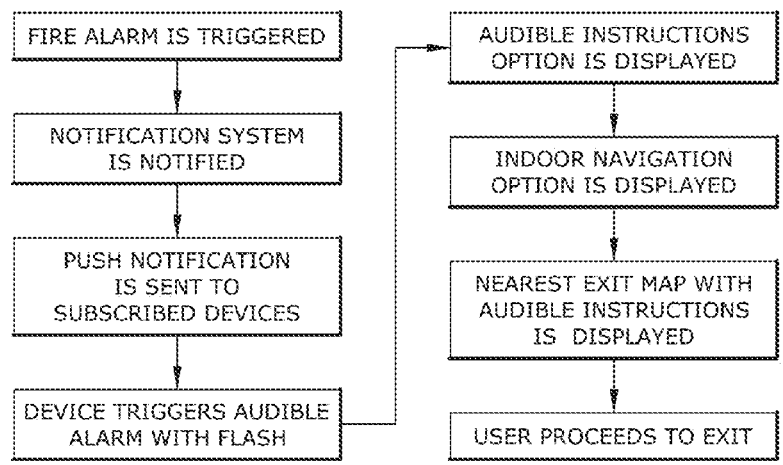
FIG. 3 is a flow chart of an emergency response flow.
Figure 4:
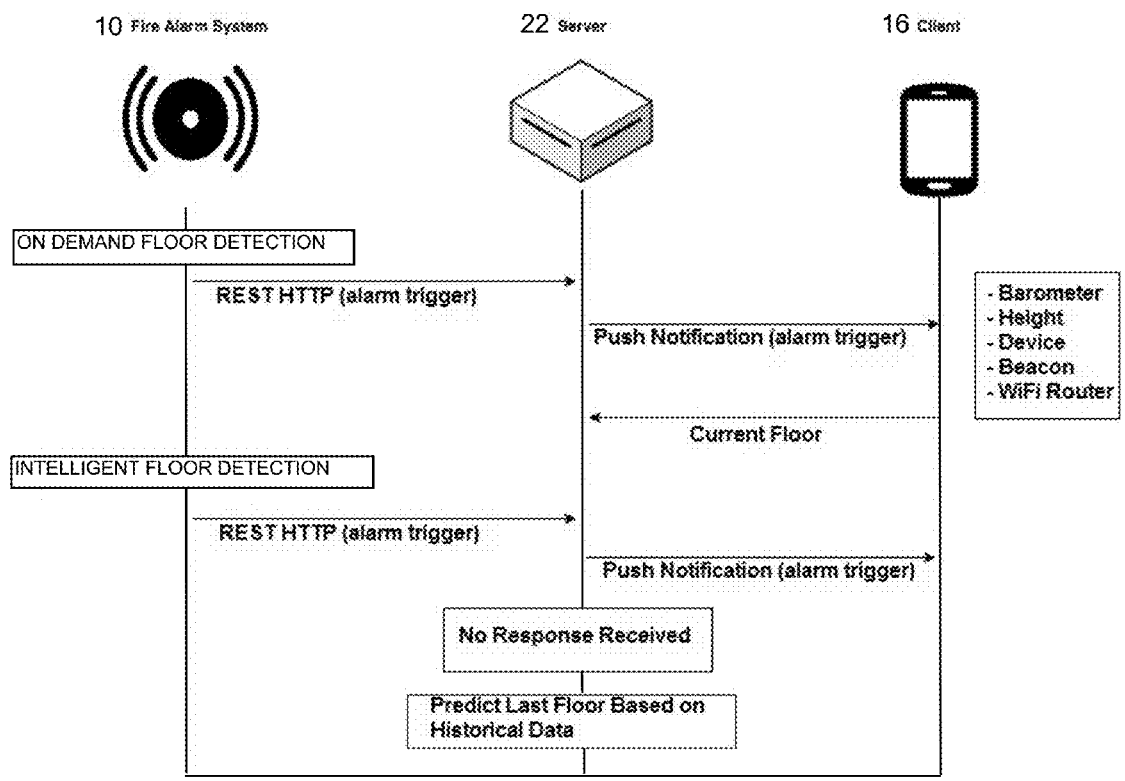
FIG. 4 is a flow chart and system architecture for a floor detection module.

A flow chart of the system process is illustrated in reference to FIG. 3. When an emergency alarm 10, such as a fire alarm, is activated, the notification system is notified of the emergency. Responsive to the notification a push notification is sent to all subscribed devices 16 associated with the location of the emergency alarm 10. The subscribed devices 16 may be configured to receive an audible alarm, a visual flashing alarm, a vibration, or combination thereof. The alarm will be triggered on devices 16 that have subscribed to the building 12 and may also be limited to devices 16 that are within a geographic vicinity of the subscribed building 12, based on a reported global positioning system (GPS) or other location information reported by the user's device 16. Each of the devices 16 that are subscribed to a building 12 may be polled for their current GPS location, before activating the application alarm on the device.

The subscribed device 16 may display an option for the user 14 to receive audible instructions to accompany a visual indoor navigation display. The instructions may direct the user 14 to the nearest exit via a map or audible instructions. and the user 14 may proceed to the nearest exit.

Floor Plan Integration

The floor plans for each business location 12 may be acquired at the time that the service is agreed with a business building 12. The information may include: an indoor map for each of the building floors; a highlighted location of fire exits; and highlighted emergency routes to the nearest exits. For security purposes, the building floor plans may be retained on the system server and may only be communicated to the client devices 16 in the event of an actual emergency condition.

Notification & Navigation System

Figure 2:
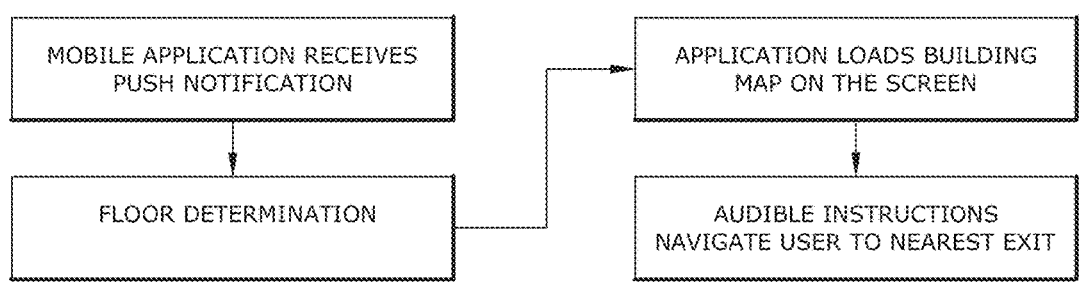
FIG. 2 is a flow chart for providing indoor navigation instruction.

A notification and navigation system is depicted in reference to FIGS. 2 and 3. When an emergency notification is received by the mobile application, the next step is to show the user 14 an interface that will easily allow them to navigate to the nearest exit. The application can provide guidance and navigation in the form of audio in conjunction with a display of visual cues from the user's device 16.

Once the user 14 opens the application, the application determines the user's current floor location and displays the current floor's map on the mobile device 16. This map may include cues to the let user know the route to the nearest exit(s). The application may also provide audio feedback which can include phrases such as:

"Please remain calm"

"Follow the signs or use the floor map to the nearest exit"

"Please proceed straight ahead"

"Please turn right/left"

Floor Detection Approach

Floor detection is one of the main features of the mobile application. When an emergency notification is received, the user 14 is presented with an option to open up the application. The opening of the application may then initiate a floor detection module. The system is configured with a floor detection module that determines a floor location of the user from a plurality of elevation determination means prioritized based on a determined level of accuracy. The floor detection module may be initiated when the application launches. The floor detection module may also be configured to initiate when the device 16 detects a beacon, WiFi, or a change in atmospheric pressure.

The plurality of elevation determination means include device sensor data, including a GPS location capability, a thermometer, a barometric pressure sensor carried in the mobile computing device 16; a beacon 18 identification; a WiFi MAC address 24; and a predictive location based on historical position data for the user 14. The plurality of elevation detection means are prioritized based on a determination of the accuracy of the determined elevation according to a ranking of each of the plurality of elevation determination means.

Beacon/WiFi Router Detection

Figure 5:
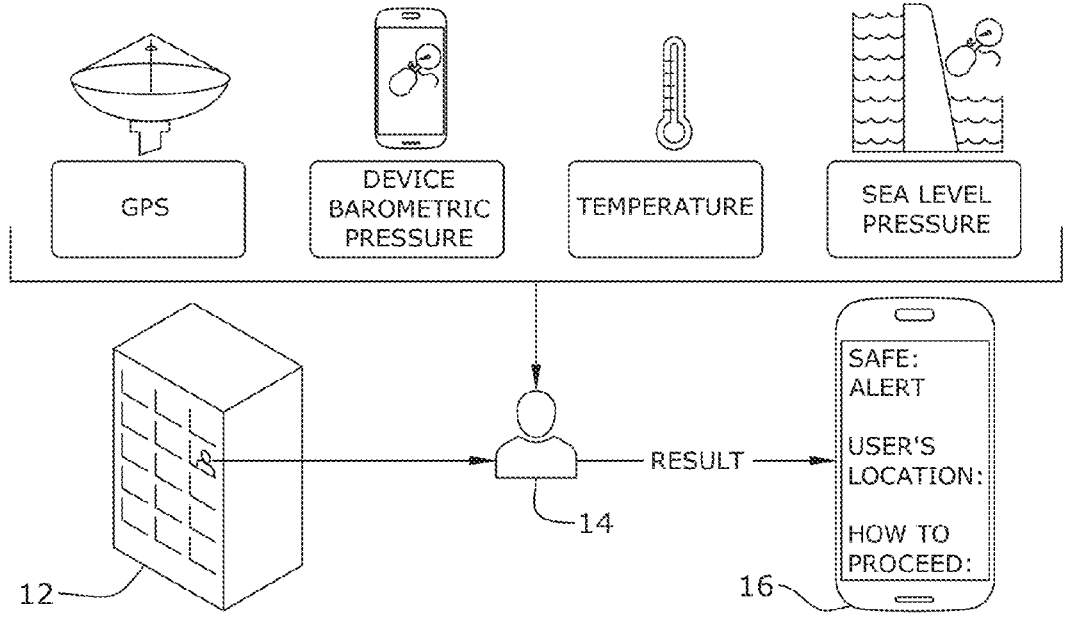
FIG. 5 is a schematic diagram of a floor detection approach.
Figure 6:
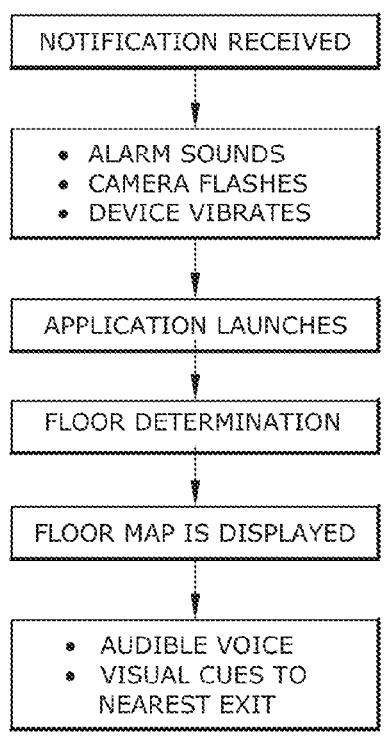
FIG. 6 is a flow chart of the notification and navigation approach.
Figure 7:
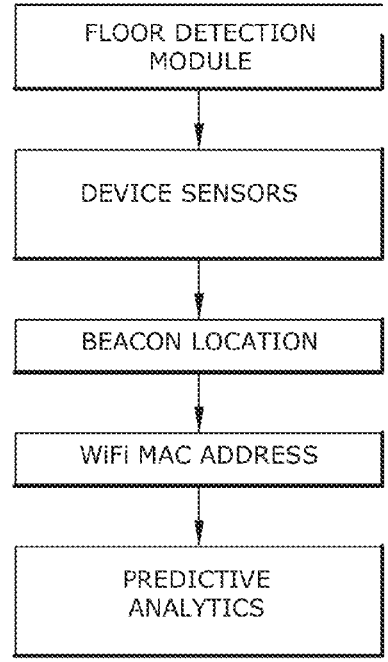
FIG. 7 is a flow chart of the SAFE floor detection module.

As seen in reference to FIG. 5, the application is prioritized to use one or more device sensors, such as a GPS, a barometer, a thermometer, a magnetometer, and the building height to determine a current floor for the user 14. Once a current floor is determined, the application may load a building map and floor plan onto the screen of the mobile device 16. In certain embodiments, a set of audible instructions may be broadcasted from the mobile device 16. The building map may identify the closest exit on the current floor. A visual instruction may also be displayed. An audible instruction may be produced. The user may then follow the instructions to an exit and to safety.

iBeacon Guidance System

Figure 8:
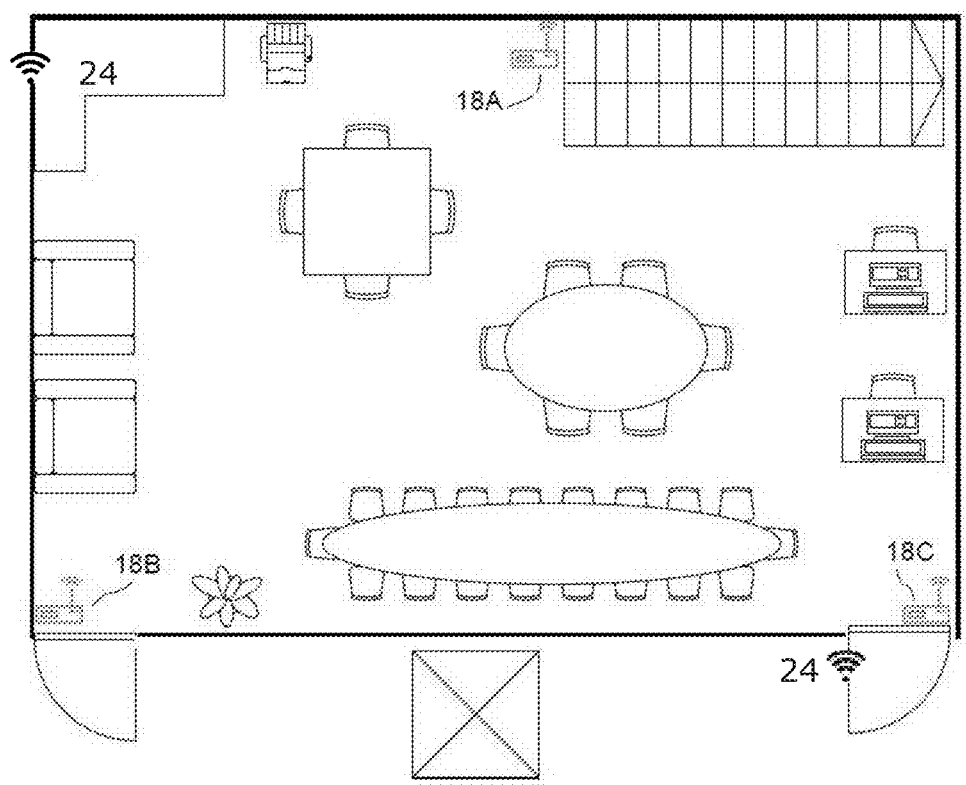
FIG. 8 is a schematic diagram for an iBeacon configuration.

As seen in reference to FIG. 8, the system may also be configured to utilize an iBeacon Guidance system, by Apple Inc., of Cupertino, Calif. When the SAFE solution is deployed in a building 12, part of the installation may involve setting up a plurality of iBeacon devices 18 in strategically determined positions to determine and provide guidance based on the user location. The iBeacon Guidance system includes the plurality of Bluetooth low energy devices (BLE) 18 that provide location information of the devices 16 in proximity to the device along the fire exit path and may also be utilized to define the exit path on a virtual floor map. The user can see the fire exit paths lit up on each floor, and can also receive step-by-step navigation along the fire exit based on their proximity to a particular BLE device 18.

As shown in reference to FIG. 8, the iBeacon devices 18 placed at different locations on the floor will allow the device 16 to determine where the user needs to go. For example, if the user is close to iBeacon 18A, the device 16 may tell the user to walk straight ahead. Whereas when the user is close to iBeacon 18B, the device would the user to proceed to the right, via audible and visual user interface instructions.

Wi-Fi MAC Address

In addition to low powered beacons, the SAFE system may also utilize the MAC address for one of a plurality of Wi-Fi networking devices 24 to determine what floor the user is currently located. When a building registers with SAFE, it may opt to provide the MAC address and location of the plurality of Wi-Fi networking devices 24 within the structure. To utilize a Wi-Fi MAC address locating, the system may be configured to determine which of the plurality of Wi-Fi devices 24 located throughout the building 12 present the best signal strength received on the device 16.

The system may also determine the MAC address for that Wi-Fi device 24 that a client device 16 is connected with and compares the MAC address to a registry of Wi-Fi devices 24 deployed in the building 12. The registry of deployed Wi-Fi devices 24 includes an installed location for each device 24 within the building, to include one or more of a floor, a room number, or a directional reference corresponding to a cardinal direction (e.g. N, S, NE, NW, etc.). Alternatively, each of the deployed Wi-Fi devices 24 may be named, based on one or more of the floor, room number, or a directional reference corresponding to a cardinal direction (e.g. "5$^{th}$ Floor, NW", "10$^{th}$ Floor, RM 1010", etc.). The user's floor location may then be determined based the MAC address of the Wi-Fi device 24.

Android Platform Devices

Implementation of the SAFE system on Android operating system devices and applications have the ability to determine the user's floor location using two different methods: 1. utilizing the iBeacon technology and re-using the same approach utilized by the iOS application; 2. utilizing Wi-Fi MAC address scanning; and 3. using the device's barometric pressure sensor and the GPS to determine the height.

The iBeacon and Wi-Fi, MAC address scanning may be implemented as described for iOS devices. The third approach may utilize the following technique:

a. Acquire the device pressure using the barometric pressure sensor http://developer.android.com/reference/android/hardware/Sensor.html#TYPE_PRESSURE), incorporated herein by reference.

b. Acquire the device latitude and longitude using the GPS.

c. Using a third party API, such as Forecast iOS, to acquire the current location's temperature and atmospheric pressure.

d. Use the following equation to determine the device height:

$$h = h_b + \frac{T_b}{L_b} \cdot \left[ \left(\frac{P}{P_b}\right)^{\frac{-R \cdot L_b}{g_0 \cdot M}} - 1 \right]$$

Reference: http://www.mide.com/products/slamstick/air-pressure-altitude-calculator.php, incorporated herein by reference.

e. Using the building's estimated floor height to determine the floor the user is currently on.

Server Specific

In cases where the client 16 is not able to acquire the user's current location, the server may use an intelligent floor detection algorithm to predict what floor the user 14 is currently located. The predicted location will be determined based on historical position data reported by the client device 16, along with one or more other parameters including the time of the day, day of the week, month, and a last known location. While inside a supported building 12, as determined by the geofence module, the client devices 16 may be configured to periodically upload floor information to the server, for example when a change in the occupied floor has been detected. The floor location will be stored by the SAFE server in a database. For each user 14. A historical profile for each user may then be created for each building 12. The historical profile will include all stored data about the user's floor location. Using basic sorting algorithms, the server may be configured to rank the top most visited floors inside a specific building, thus allowing the system to provide a prediction on where the user may be located during an emergency event.

As part of the prediction results, the server may be configured provide a level of accuracy for each of the plurality of floor detection means. For example, if method the beacon is available, the accuracy percentage will be highest. If the beacon is not available, the system may then rely on a Wi-Fi MAC address detection. Since MAC addresses from different floors can potentially provide an incorrect floor reading, the system will still provide a prediction about the floor but with a lower accuracy percentage. Lastly, if the beacon and Wi-Fi MAC address methods are not available, or have an indication of low reliability, the last approach will be purely based on historical data and will typically provide the lowest accuracy percentage. These locations may then be detected by the mobile application and transmitted to the server 20, which will allow the server 20 to determine the exact location of the user 14.

The floor prediction will be conducted by the server. When the client application sends information to the server, it will be organized and assigned a weight according to its type. By way of non-limiting example, a beacon detected may be weighted and assigned a value of 4. A detected Wi-Fi may be assigned a value of 3. A height change, determined from a barometric calculation may be weighted with a value of 2. When the server 22 routine determines the current floor, it will take all the information above and provide a weighted average. Thus, making Beacon detection have a higher impact on the floor prediction. The order of accuracy will be A, B and C. Once this routine is completed, an entry will be added to the server's database. Anytime the client device 16 sends new information to the server 22, the routine will be executed.

When an administrator launches the application, the server 22 will return the last known location for each user 14. If at the time of the request, there is no specific floor location provided within the last 8 hours, the server 22 will then look at the database for location entries for that specific user in the last 30 days. Using a sorting algorithm, the system 20 will then return the most detected floor in the building and return that information to the administrator.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer.

It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A method for determining a location and path comprising:
   notifying an automated notification system that an emergency alarm has been triggered at a specified location, the notification system hosted on a server;
   transmitting a notification from the automated notification system to a mobile application operating in a non-transitory memory of a subscribed mobile device, the notification indicating that the emergency alarm at the specified location has been triggered;
   triggering the mobile application to activate a device alarm on the mobile device;
   determining a position of the mobile device within the specified location by a floor detection module configured to determine a floor location of the user based on a plurality of floor determination means comprising: utilizing a mobile device sensor of the subscribed device; utilizing a beacon in communication with the subscribed device; utilizing a MAC address of a Wi-Fi network appliance connected to the subscribed device; and querying a database of historical floor location data corresponding to the subscribed mobile device to provide a predicted floor location based on the historical floor location data;
   providing a map on a display screen on the mobile device, the map corresponding to the determined position of the mobile device; and
   providing instructions on a path towards an exit within the specified location.

2. The method of claim 1 wherein the mobile device sensor comprises, a barometer.

3. The method of claim 2, wherein the step of determining the floor location of the mobile device comprises:
   receiving a barometric pressure measurement from the mobile device;
   receiving an atmospheric pressure and a temperature for an area in the vicinity of the specified location; and
   calculating an estimated elevation of the device at the specified location.

4. The method of claim 3, wherein the step of determining the elevation of the mobile device further comprises:
   comparing the estimated elevation of the device to a building plan corresponding to the specified location to determine a current floor of the specified location where the device is located.

5. The method of claim 4, wherein the step of providing the map on the display screen further comprises:
   providing a map corresponding to the current floor of the specified location.

6. The method of claim 5, wherein the step of providing instructions on the path towards the exit within the specified location further comprises:
   providing instructions on the path from the current floor to the exit.

7. The method of claim 1, wherein the plurality of floor determining means further comprises:
receiving a GPS altitude signal from the mobile device.

8. The method of claim 1, wherein triggering the mobile application to activate the device alarm occurs after the notification system receives information indicating the mobile device is located in a near proximity of the specified location.

9. The method of claim 1, further comprising:
polling a subscribed device to determine its position relative to the specified location; and
transmitting the notification to subscribed device determined to be located at the specified location.

10. A system for determining a location and path comprising:
a computer having a processor, and a non-transitory memory; and
a computer program product comprising machine-readable program code for causing, when executed, the computer to perform the following process steps:
receiving a notification at an automated notification system that an emergency alarm has been triggered at a specified location, the notification system hosted on a server;
transmitting a notification from the automated notification system to a mobile application operating in a non-transitory memory of a subscribed mobile device, the notification indicating that the emergency alarm at the specified location has been triggered;
triggering the mobile application to activate a device alarm on the mobile device;
determining a position of the mobile device within the specified location by a floor detection module configured to determine a floor location of the user based on a plurality of floor determination means comprising: utilizing a mobile device sensor of the subscribed device; utilizing a beacon in communication with the subscribed device; utilizing a MAC address of a Wi-Fi network appliance connected to the subscribed device; and querying a database of historical floor location data corresponding to the subscribed mobile device to provide a predicted floor location based on the historical floor location data;
providing a map on a display screen on the mobile device, the map corresponding to the determined position of the mobile device; and
providing instructions on a path towards an exit within the specified location.

11. The system of claim 10, wherein the mobile device sensor comprises, a barometer.

12. The system of claim 10, wherein the step of determining the floor location of the mobile device comprises:
receiving a barometric pressure measurement from the mobile device;
receiving an atmospheric pressure and a temperature for an area in the vicinity of the specified location; and
calculating an estimated elevation of the device at the specified location.

13. The system of claim 10, wherein the step of determining the elevation of the mobile device further comprises:
comparing the estimated elevation of the device to a building plan corresponding to the specified location to determine a current floor of the specified location where the device is located.

14. The system of claim 10, wherein the step of providing the map on the display screen further comprises:
providing a map corresponding to the current floor of the specified location.

15. The system of claim 10, wherein the step of providing instructions on the path towards the exit within the specified location further comprises:
providing instructions on the path from the current floor to the exit.

16. The method of claim 10, wherein the plurality of floor determining means further comprises:
receiving a GPS altitude signal from the mobile device.

17. The method of claim 10, wherein triggering the mobile application to activate the device alarm occurs after the notification system receives information indicating the mobile device is located in a near proximity of the specified location.

18. The method of claim 10, further comprising:
polling a subscribed device to determine its position relative to the specified location; and
transmitting the notification to subscribed device determined to be located at the specified location.

* * * * *